US012633284B2

(12) United States Patent
Peso Parada et al.

(10) Patent No.: US 12,633,284 B2
(45) Date of Patent: May 19, 2026

(54) PATCHED MULTI-CONDITION TRAINING FOR ROBUST SPEECH RECOGNITION

(71) Applicant: SAMSUNG ELECTRONICS CO., LTD., Suwon-si (KR)

(72) Inventors: Pablo Peso Parada, Staines (GB); Agnieszka Dobrowolska, Staines (GB); Karthikeyan Saravanan, Staines (GB); Mete Ozay, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 18/371,233

(22) Filed: Sep. 21, 2023

(65) Prior Publication Data

US 2024/0013775 A1     Jan. 11, 2024

Related U.S. Application Data

(63) Continuation of application No. PCT/KR2023/002236, filed on Feb. 16, 2023.

(30) Foreign Application Priority Data

Mar. 17, 2022     (GB) ...................................... 2203733
Jan. 19, 2023     (GB) ...................................... 2300844

(51) Int. Cl.
*G10L 15/06*          (2013.01)
*G10L 21/0216*     (2013.01)

(52) U.S. Cl.
CPC ........ *G10L 15/063* (2013.01); *G10L 21/0216* (2013.01)

(58) Field of Classification Search
None
See application file for complete search history.

(56) References Cited

U.S. PATENT DOCUMENTS 8,880,410 B2     11/2014     Nagel et al.
10,014,000 B2     7/2018     Nagel et al.
(Continued)

FOREIGN PATENT DOCUMENTS

CN          109741736 A     5/2019
EP          3166105 A1     5/2017
(Continued)

OTHER PUBLICATIONS

Kim et al. "SpecMix : A Mixed Sample Data Augmentation method for Training with Time-Frequency Domain Features", maskarXiv: 2108.03020v1 [cs.SD] Aug. 6, 2021 (Year: 2021).*
(Continued)

*Primary Examiner* — Nicole A K Schmieder
(74) *Attorney, Agent, or Firm* — Sughrue Mion, PLLC

(57)     ABSTRACT

A method of obtaining a patched signal for training a model for use in at least one of a speech and an audio recognition is disclosed. The method comprises obtaining a first signal, wherein the first signal is at least one of a speech and an audio signal, modifying the first signal to obtain at least one second signal, dividing the first signal and the at least one second signal respectively into a plurality of first patches and a plurality of second patches, wherein each one of the plurality of first patches comprises a respective part of the first signal and each one of the plurality of second patches comprises a respective part of the at least one second signal and mixing selected ones of the plurality of first patches and the plurality of second patches to obtain a patched signal.

14 Claims, 15 Drawing Sheets

(56) References Cited

U.S. PATENT DOCUMENTS

| | | | |
|---|---|---|---|
| 10,529,317 | B2 | 1/2020 | Lee et al. |
| 10,971,142 | B2 | 4/2021 | Sriram et al. |
| 2008/0215322 | A1 | 9/2008 | Fischer et al. |
| 2010/0318354 | A1 | 12/2010 | Seltzer et al. |
| 2011/0238416 | A1 | 9/2011 | Seltzer et al. |
| 2013/0090934 | A1 | 4/2013 | Nagel et al. |
| 2015/0170663 | A1 | 6/2015 | Disch et al. |
| 2016/0358602 | A1 | 12/2016 | Krishnaswamy et al. |
| 2017/0125012 | A1 | 5/2017 | Kanthak et al. |
| 2017/0200446 | A1 | 7/2017 | Cui et al. |
| 2018/0350379 | A1 | 12/2018 | Wung et al. |
| 2018/0350387 | A1 | 12/2018 | Nagel et al. |
| 2018/0367674 | A1 | 12/2018 | Schalk-Schupp et al. |
| 2019/0206394 | A1 | 7/2019 | Ichikawa et al. |
| 2020/0051580 | A1 | 2/2020 | Seo et al. |
| 2020/0135179 | A1 | 4/2020 | Yang et al. |
| 2021/0035563 | A1 | 2/2021 | Cartwright et al. |
| 2021/0043186 | A1 | 2/2021 | Nagano et al. |
| 2021/0065681 | A1 | 3/2021 | Soni et al. |
| 2021/0142815 | A1* | 5/2021 | Bryan ..................... G10L 21/02 |
| 2021/0343274 | A1 | 11/2021 | Kang et al. |
| 2022/0101828 | A1 | 3/2022 | Fukutomi et al. |

FOREIGN PATENT DOCUMENTS

| | | |
|---|---|---|
| JP | 2021-105684 A | 7/2021 |
| JP | 2021-135314 A | 9/2021 |
| WO | 2020/219971 A1 | 10/2020 |

OTHER PUBLICATIONS

Smyth et al. "A Virtual Acoustic Film Dubbing Stage", Spatial Audio, Sense the Space of Sound, AES 40th Conference, Tokyo, 2010 (Year: 2010).*

Communication dated Jul. 19, 2023, issued by the United Kingdom Patent Office for United Kingdom Patent Application No. 2300844.4.

E. Tsunoo, K. Shibata, C. Narisetty, Y. Kashiwagi, and S. Watanabe, "Data augmentation methods for end-to-end speech recognition on distant-talk scenarios", INTERSPEECH 2021, 2021, 5 pages.

C. Richey, M. A. Barrios, Z. Armstrong, C. Bartels, H. Franco, M. Graciarena, A. Lawson, M. K. Nandwana, A. R. Stauffer, J. van Hout, P. Gamble, J. Hetherly, C. Stephenson, and K. Ni, "Voices obscured in complex environmental settings (VOICES) corpus", CoRR, vol. abs/1804.05053, May 15, 2018, 5 pages, arXiv:1804.05053v2 [cs.SD].

D. S. Park, W. Chan, Y. Zhang, C. Chiu, B. Zoph, E. D. Cubuk, and Q. V. Le, "Specaugment: A simple data augmentation method for automatic speech recognition", in INTERSPEECH 2019, ISCA, 2019, pp. 2613-2617.

T. Ko, V. Peddinti, D. Povey, and S. Khudanpur, "Audio augmentation for speech recognition", in INTERSPEECH, ISCA, 2015, pp. 3586-3589.

N. Jaitly and G. E. Hinton, "Vocal tract length perturbation (VTLP) improves speech recognition", Proceedings of the 30 th International Conference on Machine Learning, Speech and Language, vol. 28, 2013, 5 pages.

C. Kim, M. Shin, A. Garg, and D. Gowda, "Improved vocal tract length perturbation for a state-of-the-art end-to-end speech recognition system", in Interspeech 2019, ISCA, 2019, pp. 739-743, http://dx.doi.org/10.21437/Interspeech.2019-3227.

V. Peddinti, D. Povey, and S. Khudanpur, "A time delay neural network architecture for efficient modeling of long temporal contexts", in INTERSPEECH, ISCA, 2015, pp. 3214-3218.

A. Jain, P. R. Samala, D. Mittal, P. Jyothi, and M. Singh, "SPLICEOUT: A simple and efficient audio augmentation method", CoRR, vol. abs/2110.00046, Oct. 13, 2021, 24 pages, arXiv:2110.00046v2 [cs.SD].

H. Wang, Y. Zou, and W. Wang, "Specaugment++: A hidden space data augmentation method for acoustic scene classification", CoRR, vol. abs/2103.16858, Jun. 15, 2021, 5 pages, arXiv:2103.16858v3 [eess.AS].

X. Song, Z. Wu, Y. Huang, D. Su, and H. Meng, "SpecSwap: A simple data augmentation method for end-to-end speech recognition", in INTERSPEECH 2020, ISCA, 2020, pp. 581-585, http://dx.doi.org/10.21437/Interspeech.2020-2275.

A. N. Carr, Q. Berthet, M. Blondel, O. Teboul, and N. Zeghidour, "Self-supervised learning of audio representations from permutations with differentiable ranking", IEEE Signal Process. Lett., vol. 28, pp. 708-712, Mar. 17, 2021, arXiv:2103.09879v1 [cs.SD].

L. Meng, J. Xu, X. Tan, J. Wang, T. Qin, and B. Xu, "Mixspeech: Data augmentation for low-resource automatic speech recognition," in ICASSP. IEEE, Feb. 25, 2021, pp. 7008-7012, arXiv:2102.12664v1 [cs.CL].

H. Zhang, M. Cissé, Y. N. Dauphin, and D. Lopez-Paz, "mixup: Beyond empirical risk minimization", in ICLR 2018, Open-Review.net, 2018, 13 pages.

Y. Tokozume, Y. Ushiku, and T. Harada, "Learning from between-class examples for deep sound recognition", in ICLR 20108, 2018, 13 pages, https://github.com/mil-tokyo/bc_learning_sound/.

T. K. Lam, M. Ohta, S. Schamoni, and S. Riezler, "On-the-fly aligned data augmentation for sequence-to-sequence ASR", INTERSPEECH 2021, ISCA, 2021, 5 pages, http://dx.doi.org/10.21437/Interspeech.2021-1679.

T. Nguyen, S. Stüker, J. Niehues, and A. Waibel, "Improving sequence-to-sequence speech recognition training with on-the-fly data augmentation", in ICASSP. IEEE, Feb. 3, 2020, pp. 7689-7693, arXiv:1910.13296v2 [eess.AS].

D. Yu, M. L. Seltzer, J. Li, J. Huang, and F. Seide, "Feature learning in deep neural networks—Studies on speech recognition tasks", in ICLR, Jan. 16, 2013, 9 pages, arXiv:1301.3605v1 [cs.LG].

A. Y. Hannun, C. Case, J. Casper, B. Catanzaro, G. Diamos, E. Elsen, R. Prenger, S. Satheesh, S. Sengupta, A. Coates, and A. Y. Ng, "Deep speech: Scaling up end-to-end speech recognition", CoRR, vol. abs/1412.5567, Dec. 19, 2014, 12 pages, arXiv: 1412.5567v2 [cs.CL].

V. A. Trinh, H. S. Kavaki, and M. I. Mandel, "Importantaug: a data augmentation agent for speech", Proc. ICASSP 2022, Feb. 19, 2022, 5 pages, arXiv:2112.07156v2 [eess.AS].

A. Sriram, H. Jun, Y. Gaur, and S. Satheesh, "Robust speech recognition using generative adversarial networks", in ICASSP. IEEE, Nov. 5, 2018, pp. 5639-5643, imarXiv: 1711.01567v1 [cs.CL].

E. Tsunoo, K. Shibata, C. Narisetty, Y. Kashiwagi, and S. Watanabe, "Data augmentation methods for end-to-end speech recognition on distant-talk scenarios", CoRR, vol. abs/2106.03419, Jun. 7, 2021, 5 pages, arXiv:2106.03419v1 [eess.AS].

J. B. Allen and D. A. Berkley, "Image method for efficiently simulating small-room acoustics", The Journal of the Acoustical Society of America, vol. 65, No. 4, pp. 943-950, Apr. 1979.

E. A. Lehmann, A. M. Johansson, and S. Nordholm, "Reverberation-time prediction method for room impulse responses simulated with the image-source model", in 2007 IEEE Workshop on Applications of Signal Processing to Audio and Acoustics, IEEE, Nov. 2007, pp. 159-162, DOI:10.1109/ASPAA.2007.4392980.

T. Ko, V. Peddinti, D. Povey, M. L. Seltzer, and S. Khudanpur, "A study on data augmentation of reverberant speech for robust speech recognition", in 2017 IEEE International Conference on Acoustics, Speech and Signal Processing (ICASSP), IEEE, 2017, pp. 5220-5224.

C. Kim, A. Misra, K. Chin, T. Hughes, A. Narayanan, T. Sainath, and M. Bacchiani, "Generation of large-scale simulated utterances in virtual rooms to train deep-neural networks for far-field speech recognition in google home", in Interspeech 2017, Aug. 2017, pp. 379-383, http://dx.doi.org/10.21437/Interspeech.2017-1510.

J. Li, L. Deng, Y. Gong, and R. Haeb-Umbach, "An overview of noise-robust automatic speech recognition", IEEE Acm Trans. Audio Speech Lang. Process., vol. 22, No. 4, pp. 745-777, Apr. 2014.

D. S. Park, Y. Zhang, C.-C. Chiu, Y. Chen, B. Li, W. Chan, Q. V. Le, and Y. Wu, "Specaugment on large scale datasets", in ICASSP 2020-2020 IEEE International Conference on Acoustics, Speech and Signal Processing (ICASSP), IEEE, Dec. 11, 2020, pp. 6879-6883, arXiv:1912.05533v1 [eess.AS].

(56) References Cited

OTHER PUBLICATIONS

J. Kim, M. Kumar, D. Gowda, A. Garg, and C. Kim, "A comparison of streaming models and data augmentation methods for robust speech recognition", Nov. 19, 2021, 7 pages, augmenarXiv:2111. 10043v1 [eess.AS].

S. Barreda, "Perceptual validation of vowel normalization methods for variationist research", Language Variation and Change, vol. 33, No. 1, p. 27-53, 2021, doi: 10.1017=S0954394521000016.

C. Fefferman, S. Mitter, and H. Narayanan, "Testing the manifold hypothesis," Journal of the American Mathematical Society, vol. 29, No. 4, pp. 983-1049, Oct. 2016, http://dx.doi.org/10.1090/jams/852.

C. Vaz and S. Narayanan, "Learning a speech manifold for signal subspace speech denoising", in Interspeech 2015, Dresden, Germany, Sep. 2015, pp. 1735-1739.

A. Sinha, K. Ayush, J. Song, B. Uzkent, H. Jin, and S. Ermon, "Negative data augmentation", in International Conference on Learning Representations, Feb. 9, 2021, 17 pages, arXiv:2102.05113v1 [cs.CV].

M. Ravanelli, T. Parcollet, P. Plantinga, A. Rouhe, S. Cornell, L. Lugosch, C. Subakan, N. Dawalatabad, A. Heba, J. Zhong, J.-C. Chou, S.-L. Yeh, S.-W. Fu, C.-F. Liao, E. Rastorgueva, F. Grondin, W. Aris, H. Na, Y. Gao, R. D. Mori, and Y. Bengio, "SpeechBrain: A general-purpose speech toolkit", Jun. 8, 2021, 34 pages, arXiv:2106. 04624v1 [eess.AS].

A. Gulati, J. Qin, C.-C. Chiu, N. Parmar, Y. Zhang, J. Yu, W. Han, S. Wang, Z. Zhang, Y. Wu, and R. Pang, "Conformer: Convolution-augmented transformer for speech recognition", May 16, 2020, 5 pages, improvearXiv:2005.08100v1 [eess.AS].

V. Panayotov, G. Chen, D. Povey, and S. Khudanpur, "Librispeech: an ASR corpus based on public domain audio books", in 2015 IEEE international conference on acoustics, speech and signal processing (ICASSP), IEEE, 2015, pp. 5206-5210.

P. Peso Parada, D. Sharma, J. Lainez, D. Barreda, T. v. Waterschoot, and P. A. Naylor, "A Single-Channel Non-Intrusive C50 Estimator Correlated With Speech Recognition Performance", IEEE/ACM Transactions on Audio, Speech, and Language Processing, vol. 24, No. 4, 15 pages, 2016.

D. Snyder, G. Chen, and D. Povey, "MUSAN: A Music, Speech, and Noise Corpus", Center for Language and Speech Processing, The Johns Hopkins University, Oct. 28, 2015, 4 pages, arXiv:1510. 08484v1 [cs.SD].

Alex Graves et al., "Connectionist temporal classification: Labelling unsegmented sequence data with recurrent neural networks", In Proceedings of the International Conference on Machine Learning, ICML 2006, 2006, pp. 369-376.

* cited by examiner

Room-1 ($R_1$)

Room-2 ($R_2$)

Room-3 ($R_3$)

Room-4 ($R_4$)

PATCHED MULTI-CONDITION TRAINING FOR ROBUST SPEECH RECOGNITION

CROSS-REFERENCE TO RELATED APPLICATION(S)

This application is a continuation of PCT/KR2023/002236, filed on Feb. 16, 2023, at the Korean Intellectual Property Receiving Office and claims priority under 35 U.S.C. § 119 to GB Patent Application No. 2203733.7, filed on Mar. 17, 2022, in the Intellectual Property Office of the United Kingdom, the disclosures of all of which are incorporated by reference herein in their entireties.

BACKGROUND

1. Field

The application relates to methods, apparatuses and computer programs for training a model for use in speech and/or audio recognition, and to methods, apparatuses and computer programs for performing automatic speech recognition.

2. Description of Related Art

With the rising integration of voice search and voice interaction systems in products such as smart mobile devices and home appliances, there is an increasing need for developing robust automatic speech recognition (ASR) systems which perform well under a wide range of real-world noise and acoustic distorting conditions. One of the challenges associated with training such models arises from the mismatch between training and test conditions, since models trained on curated close-talk training datasets do not generalize well to real-world environments with additive noise, channel distortion and reverberation.

Considering the number and variety of noise types observed in real-world scenarios, acquisition of sufficiently diverse training data is not trivial. Hence, data augmentation is commonly utilized to diversify and enlarge the training corpus, acting as a regularizer to prevent overfitting and thus increasing overall model robustness.

The application is made in this context.

SUMMARY

According to a first aspect of the present application, there is provided a method of obtaining a patched signal for training a model for use in at least one of a speech and an audio recognition, the method comprising: obtaining a first signal, wherein the first signal is at least one of a speech and audio signal: modifying the first signal to obtain at least one second signal: dividing the first signal and the at least one second signal respectively into a plurality of first patches and a plurality of second patches, wherein each one of the plurality of first patches comprises a respective part of the first signal and each one of the plurality of second patches comprises a respective part of the at least one second signal; and mixing selected ones of the plurality of first patches and the plurality of second patches to obtain a patched signal.

In some embodiments according to the first aspect, mixing the selected ones of the plurality of first patches and the plurality of second patches comprises randomly selecting respective ones of the first and second patches, and combining the randomly selected first and second patches to obtain the patched signal.

In some embodiments according to the first aspect, the ones of the first and second patches are randomly selected according to at least one probability threshold, such that the at least one probability threshold defines a probability of one of the plurality of first patches being selected for a given part of the patched signal and a probability of one of the plurality of second patches being selected for the given part of the patched signal.

In some embodiments according to the first aspect, the at least one probability threshold is set in dependence on an identity of the current user, such that different values of the at least one probability threshold may be set for different users.

In some embodiments according to the first aspect, the at least one probability threshold is set in dependence on historical data associated with the identity of the current user.

In some embodiments according to the first aspect, modifying the first signal comprises convolving the first signal with a distortion function.

In some embodiments according to the first aspect, the distortion function is a room impulse response, RIR, function.

In some embodiments according to the first aspect, the RIR function introduces a delay in the at least one second signal relative to the first signal, the method further comprising removing the delay from the at least one second signal prior to obtaining the patched signal.

In some embodiments according to the first aspect, modifying the first signal comprises adding noise into the first signal.

In some embodiments according to the first aspect, the noise comprises random noise.

In some embodiments according to the first aspect, the noise comprises one or more recordings of background noise samples.

In some embodiments according to the first aspect, the noise comprises one or more synthesized noise samples.

In some embodiments according to the first aspect, the at least one second signal comprises a plurality of second signals, and modifying the first signal to obtain the plurality of second signals comprises applying different modifications to the first signal to obtain respective ones of the plurality of second signals.

In some embodiments according to the first aspect, each of the first and second patches have the same length.

In some embodiments according to the first aspect, each of the first and second patches has a randomly determined length.

BRIEF DESCRIPTION OF THE DRAWINGS

Embodiments of the present disclosure will now be described, by way of example only, with reference to the accompanying drawings, in which.

DETAILED DESCRIPTION

Figure 1:
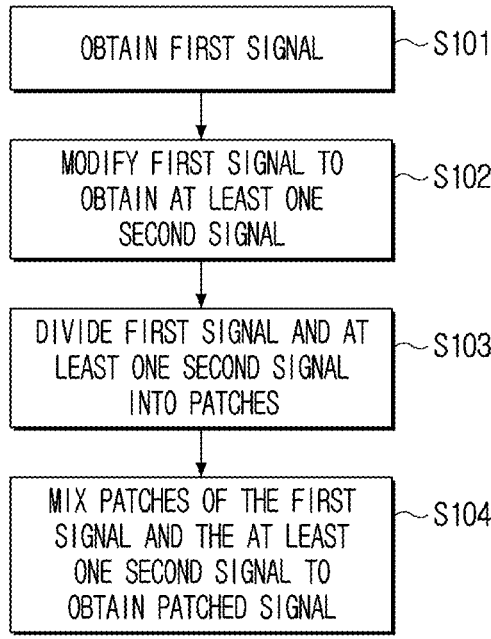
FIG. 1 is a flowchart illustrating a method of obtaining a patched signal for training a model for use in speech and/or audio recognition, according to an embodiment of the present application.

In the following detailed description, only certain exemplary embodiments have been shown and described, simply by way of illustration. As those skilled in the art would realise, the described embodiments may be modified in various different ways, all without departing from the scope of the present application. Accordingly, the drawings and description are to be regarded as illustrative in nature and not restrictive. Like reference numerals designate like elements throughout the specification.

The present disclosure proposes a novel patched multi-condition training (pMCT) method for robust ASR. The pMCT method employs multicondition audio modification and patching (MAMP) to mix patches of the same utterance extracted from clean and distorted speech. This training approach using patch-modified signals improves robustness of models in noisy reverberant scenarios. The proposed pMCT is evaluated on the LibriSpeech datasets showing improvement over using vanilla multi-condition training (MCT). Moreover, the pMCT is employed for speech recognition on the VOICES dataset which is a noisy reverberant dataset generated based on the utterances of the LibriSpeech dataset. In the analyses, pMCT achieves 22.71% relative WER reduction compared to the MCT.

Referring now to FIG. 1, a flowchart is shown illustrating a method of obtaining a patched signal for training a model for use in speech and/or audio recognition, according to an embodiment of the present application. Embodiments of the application are described below in the context of automatic speech recognition (ASR), however, it should be appreciated that the same approach may be adopted to recognise other types of audio.

First, in step S101 a first signal is obtained, wherein the first signal is a speech and/or audio signal. In embodiments that are applied to ASR, the first signal may be referred to as a 'speech signal', and so references to 'speech signals' hereinafter should be understood as referring to the 'first signal' in the context of FIG. 1. Depending on the implementation, the first signal that is obtained in step S101 could be a signal that is captured and processed substantially in real-time, or could be a signal that has been recorded previously, stored in a suitable recording medium, and subsequently retrieved in step S101 for further processing.

Next, in step S102 the first signal is modified to obtain at least one second signal. For example, the first signal may be modified by introducing noise to the signal, such that the resulting second signal(s) may be referred to as 'noisy' signal(s). Methods of modifying the first signal are described in more detail below.

Then, in step S103 the first signal and the at least one second signal are divided respectively into a plurality of first patches and a plurality of second patches, such that each one of the plurality of first patches comprises a respective part of the first signal and each one of the plurality of second patches comprises a respective part of the at least one second signal. Depending on the implementation, the first and second signals may be divided in the time-domain, or may be divided in another domain (e.g. the frequency domain) after applying a suitable domain transformation to the first and second signals.

Then, in step S104 selected ones of the plurality of first patches and the plurality of second patches are mixed to obtain a patched signal. Mixing the selected first and second patches may comprise arranging the first and second patches in the same order in which the respective portions of the first and second signals appear in the time domain, such that each portion of the patched signal contains either a part of the original first signal (which may be referred to as the 'clean' signal), or a part of the modified signal (e.g. the 'noisy' signal). As explained in more detail below, using patched signals obtained in this way to train an audio recognition model can help to improve the accuracy of the model.

Figure 2:
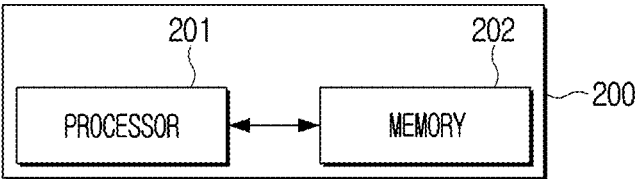
FIG. 2 illustrates apparatus for obtaining a patched signal for training a model for use in speech and/or audio recognition, according to an embodiment of the present application.

In embodiments of the present application, apparatus for implementing methods disclosed herein, including methods for obtaining patched signals and methods for automatic speech recognition (ASR), can be implemented in software. Accordingly, apparatus for implementing any of the method disclosed herein can have the form shown in FIG. 2. Specifically, the apparatus 200 of FIG. 2 comprises one or more processors 201, and memory 202 adapted to store computer program instructions which, when executed by the one or more processors, cause the apparatus to perform the relevant method. The memory 202 may comprise any suitable transitory or non-transitory computer-readable storage medium adapted to store the computer program instructions.

The remainder of the present disclosure is organised as follows: related work is given in Section 2. Section 3 presents the method proposed in this disclosure. The evaluation setup and the results obtained are detailed in Section 4 and Section 5. Finally, in Section 6 the conclusions are drawn.

2. RELATED WORK

2.1. Traditional Signal Processing

A number of approaches based on traditional signal processing have been proposed. Simple time-domain augmentations include modifying the sampling rate by a small factor, such as ±10%, which changes pitch and duration of the audio. Some approaches focus on augmenting speaker characteristics, e.g., Vocal Track Length Perturbation (VLTP) modifies the Vocal Track Length-a speech characteristic which varies from person to person. Speed perturbation, a widely used augmentation, can be seen as emulating tempo perturbation and VTLP. As the variance in audio volume can be low in curated datasets, volume perturbation has been used to randomly scale the training data.

2.2. Masking, Swapping and Mixing

Taking inspiration from data augmentation approaches developed for vision, some audio methods treat the log mel spectrogram as an image and apply transformations such as masking, swapping and mixing.

Masking: SpecAugment acts by randomly masking chunks of time (time masking) or frequency channels (frequency masking) on log mel spectrograms-filling the masked areas with either zeros or average values. Recently, a number of variants of SpecAugment have been proposed. Splice-Out can be seen as a more efficient version of SpecAugment-instead of masking splices of consecutive time-steps, Spliceout removes selected time blocks entirely from the audio and stitches together the remaining parts. SpecAugment++ applies frequency and time masking not only to the input spectrogram but also to the hidden space of the neural network. Systematic omission of frequency channels of the input spectrogram has been studied in the related art.

Swapping: One of the approaches in SpecAugment++ proposes filling the masked out areas with the time frames and frequency channels of other samples within the minibatch. Similarly, SpecSwap swaps time blocks and frequency blocks, however the interchanged sections originate from the same audio. Some works propose learning to reorder the shuffled spectrogram patches, utilizing a fully-differentiable permutation loss.

Mixing: MixSpeech, an adaptation of Mixup for ASR, and Between-Class (BC) learning generate new training samples by interpolating multiple audio samples. SpeechMix can be seen as a generalization of BC, which also applies interpolations on the latent space. While earlier-mentioned approaches apply label-preserving transformations, MixSpeech, BC and SpeechMix all alter the labels, which has been shown to result in training instabilities in some cases.

Alignment for Data Generation: Estimated alignment information can be used to generate previously unseen combinations of utterances and speakers. Similarly, Alignments are used to sub-sample the training utterances in order to generate more variants of target sequences.

2.3. Augmentations for Noise-Robustness

Methods introduced so far make ASR models more robust by acting as regularizers and thus preventing overfitting. Another family of augmentation approaches specifically targets improving performance in noisy and reverberant scenarios.

Additive Noise: A common approach for diversifying the training corpus is to convolve noise from another source with the original waveform, sampling the SNR levels from a random distribution. ImportantAug learns an importance map for the audio and only adds noise to unimportant regions.

Generating Additional Data: While traditional approaches apply noise directly to the original waveform, some works use Generative Adversarial Networks to match the noisy test conditions.

Simulating Room Impulse Response: In far-field scenarios, where the target talker is far from the microphone, the acoustic response of the environment can differ quite significantly from the typical close-talk recorded training data. Earlier works started by measuring or estimating the Room Impulse Response (RIR) of the target room and then generated reverberant training corpora by convolving clean-speech signals with the estimated RIR. Development of realistic room acoustic simulators allows for generating copies of a clean training sample under a range acoustic conditions.

Multi-condition training: Recently, Multi-Condition Training (MCT), also referred to as Multistyle Training (MTR), which combines distorting the speech with real world room impulse response (RIR) with additive noise, has lead to creation of some of the most robust ASR models.

3. PATCHED MULTI-CONDITION TRAINING FOR ROBUST SPEECH RECOGNITION

In this section, the proposed patched multi-condition training pipeline depicted in FIG. 1 is described. The multi-condition audio modification and patching (MAMP) method is employed in pMCT to improve accuracy of ASR models in real-world ASR use-cases, such as in far field set-ups where reverberation and noise significantly distort the speech signal. In the next subsection, the theoretical motivation of the proposed method is introduced.

3.1. Data Augmentation with Patches of Speech Manifolds for Robust Speech Recognition ASR algorithms always rely on prior knowledge via inductive biases e.g., by using neural networks (NNs) when a data distribution P is unknown. Similarly, data augmentation (DA) strategies exploit known invariances of data, such as being invariant to phone-preserving transformations.

Typical DA strategies exploit prior knowledge about what is in support $\sigma(P)$ of P. However, particularly in real-world applications such as ASR in noisy, reverberant and far-field scenarios, the prior information may not be available in the $\sigma(P)$. Therefore, embodiments of the present application may exploit prior knowledge about what is not in the $\sigma(P)$ while training ASR models.

This information is often available for audio data. Specifically, it may be assumed that: (1) there exists an alternative distribution Q with a different support $\sigma(Q)$; and (2) access to a procedure to efficiently sample from Q. Here, it should be appreciated that Q need not be explicitly defined (e.g., through an explicit density)—it may be implicitly defined by a dataset collected in these scenarios, or by a procedure that transforms samples from P into ones from Q by suitably altering their structure, such as by audio modification to obtain y(n).

According to the manifold hypothesis, utterances in speech signals lie on low-dimensional manifolds. Following, it may be assumed that phonemes and utterances lie on Euclidean patches of the manifold. Thereby, P is supported on a low-dimensional manifold of the ambient (signal) space. This suggests that many DA strategies exist, such as sampling random or reverberant noise.

DA is informative if its support is close (in a suitable metric) to σ(P). These noisy samples will provide information on the ("boundary") of σ(P), which can be helpful in ASR. Therefore, embodiments of the present application do not need to perform computationally complex projections on low-dimensional manifolds as proposed in manifold learning methods to remove noise from samples. Instead, it is proposed to employ the inductive bias with DA on patches to improve robustness of samples to noise.

3.2. Audio Modification in MAMP

Figure 4A:
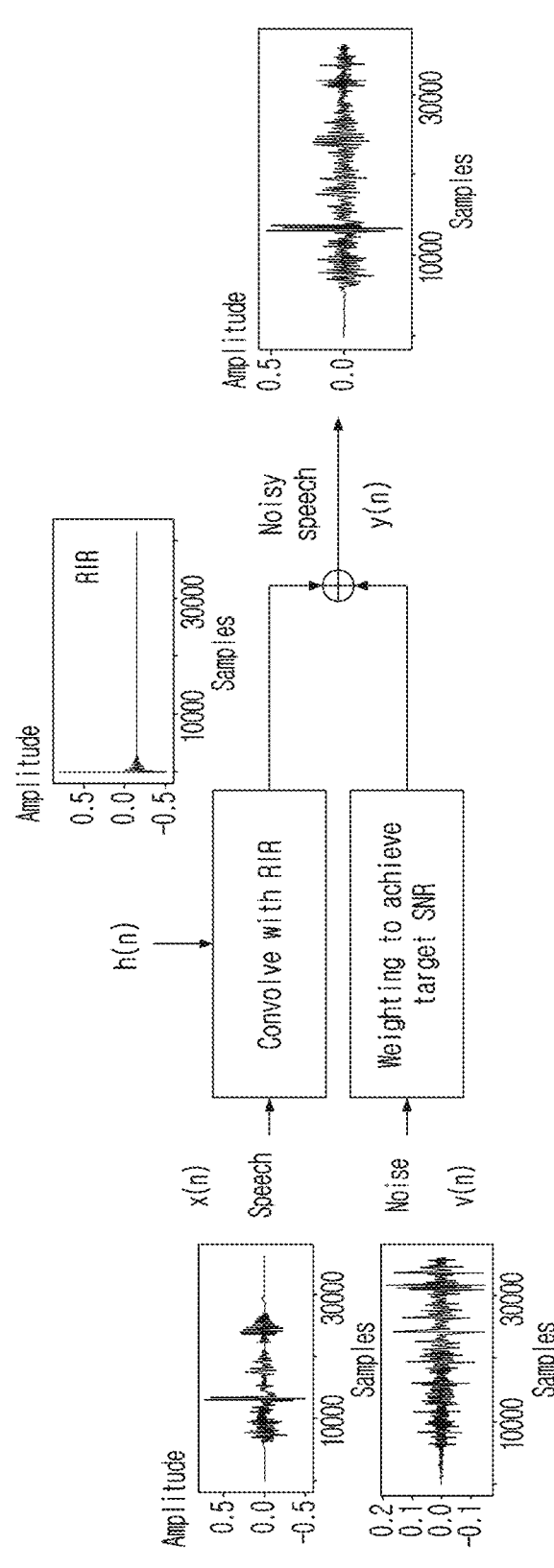
FIG. 4a is a flowchart illustrating an audio modification (noisy speech generation) operation in a multi-condition audio modification and patching (MAMP) method, according to an embodiment of the present application.
Figure 4B:
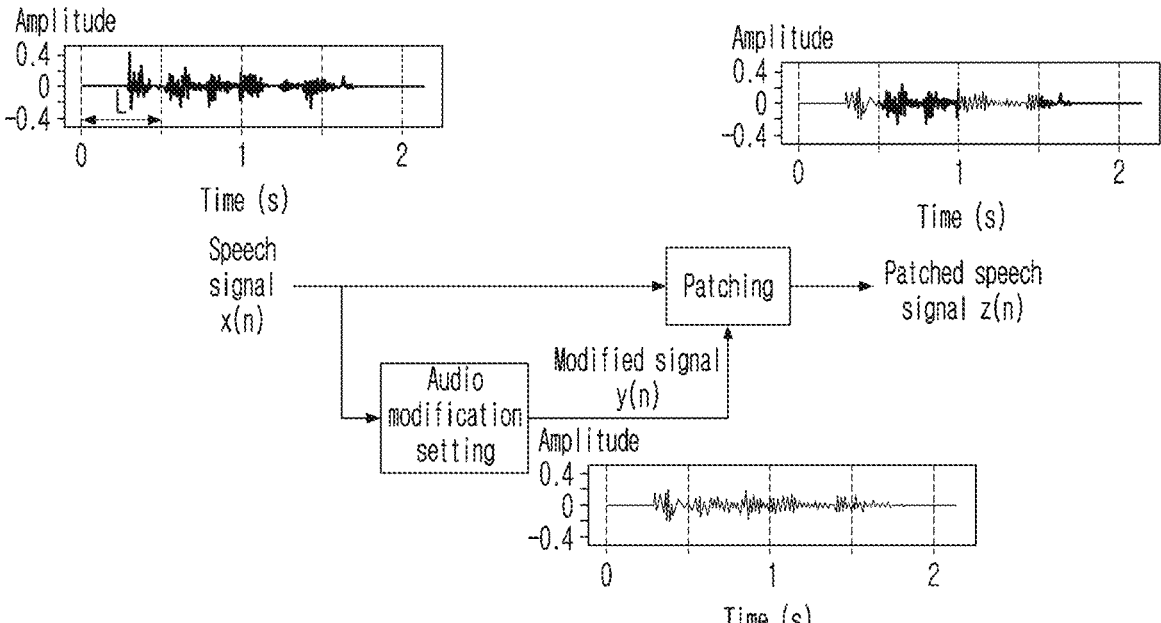
FIG. 4b is a flowchart illustrating a patching operation in the MAMP method, according to an embodiment of the present application.
Figure 5A:
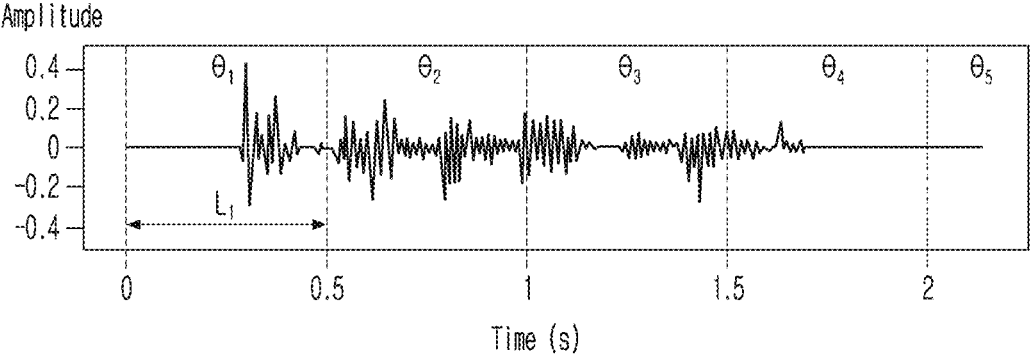
FIG. 5a illustrates a waveform of a sample clean speech signal x(n) of length n split in patches θp with length Lp for p=1, 2, . . . , 5, according to an embodiment of the present application.

MCT may involve performing data augmentation by convolving a speech signal x(n) of length L (FIG. 5a) with a convolutive channel distortion h(n) to introduce distortion followed by adding a noise source v(n) to generate the simulated speech y(n) (FIGS. 4a and 4b and FIG. 5b) for each time index n $$y(n) = h(n) \star x(n) + v(n) \qquad (1)$$

where ★ denotes the convolution operation. Applying this transformation on-the-fly generates highly diverse training scenarios without increasing storage.

In some embodiments h(n) may be defined by Room Impulse Response (RIR), then h(n) introduces reverberation to x(n) and y(n) simulates far-field speech. The RIR function may introduce a delay in the at least one second signal relative to the first signal, in which case the delay may be removed from the at least one second signal prior to obtaining the patched signal. For example, the RIR function may act as a filter, and the delay of the filter can be determined from the filter coefficients (i.e. the coefficients of the RIR function). The delay can be removed by chopping the first X ms (milliseconds) from the noisy signal after applying the RIR function, where X is set according to the filter delay as determined from the filter coefficients. However, in other embodiments, instead of removing the delay after obtaining the noisy signal, the filter (i.e. the RIR function) may be configured to remove the delay in the filter itself.

In some embodiments, the step of modifying the speech signal may comprise adding noise into the speech signal. For example, the noise may comprise random noise, and/or may comprise other forms of noise such as speech or other audio overlaid on top of the speech signal (i.e. the 'first signal'). In some embodiments, the noise that is added to the speech signal to obtain the noisy signal may comprise one or more recordings of background noise samples, and/or one or more synthesized noise samples.

In some embodiments, the noise may comprise a transformation applied to a target audio signal, for example speech. As noted above, the transformation may be additive, for example in the form of background noise overlaid on top of the target audio signal. Instead of, or in addition to, an additive transformation such as overlaid background noise, the transformation may be configured to simulate a technical fault, such as intermittent loss of audio or reduction in audio quality due to a faulty sensor or microphone.

3.3. MAMP on Audio and Feature Space

In this section, the proposed MAMP method is introduced.

3.3.1. MAMP on Audio Signal Space

Figure 5B:
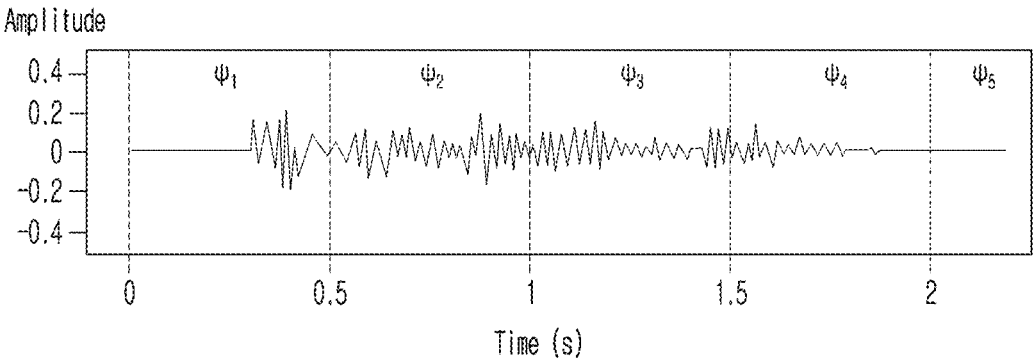
FIG. 5b illustrates a waveform of a noisy signal y(n) comprising the signal x(n) of FIG. 5a with distortion (reverberation) and noise (obtained by equation (1)) split in patches {φp}5p=1, according to an embodiment of the present application.

In an embodiment of the present application, patches are extracted from audio signals and mixed as follows:

Modification step: A clean speech signal x(n) (FIG. 5a) is modified to obtain y(n) using equation (1) (FIG. 5b).

Figure 3:
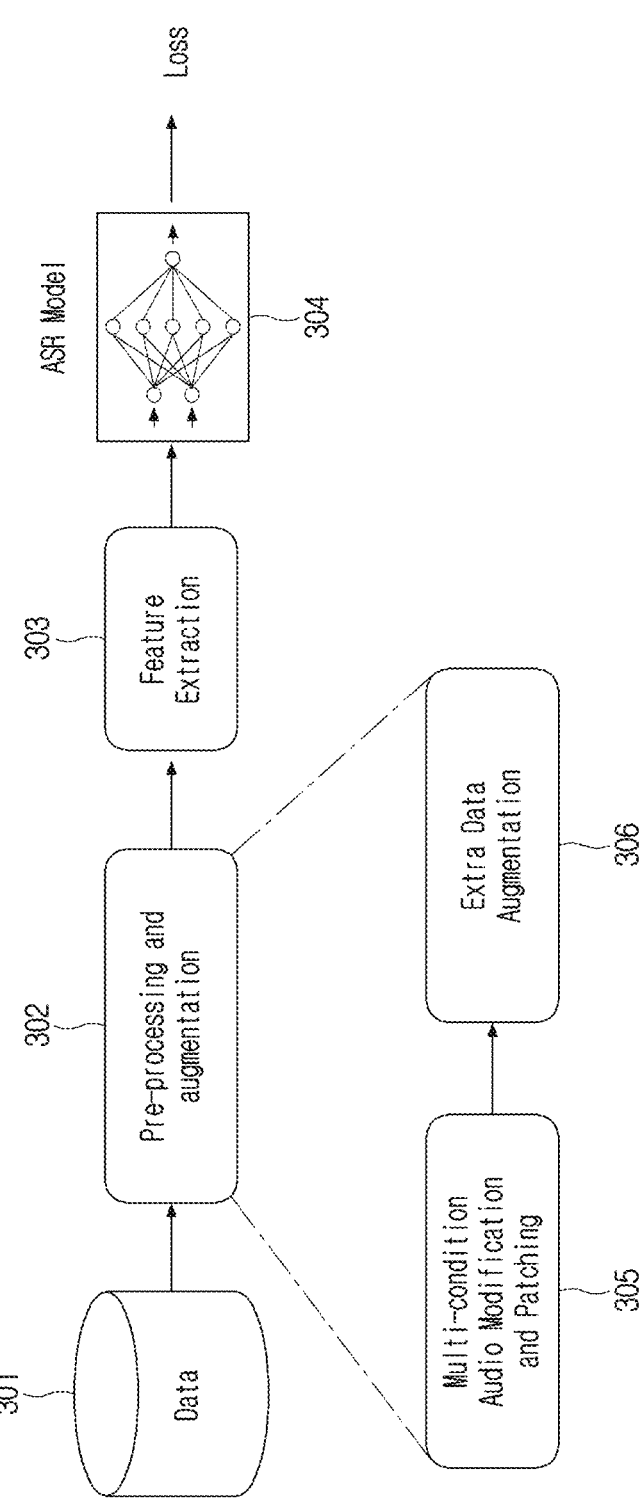
FIG. 3 is a flowchart illustrating a patched multi-condition training (pMCT) pipeline, according to an embodiment of the present application.

Patch extraction step: The signals x(n) and y(n) are split into patches θp and φp respectively of size Lp where $$\sum_{p=1}^{P} L_p = L,$$

as depicted by the vertical dashed lines in FIG. 3. Thereby, clean patches $$\{\theta_p\}_{p=1}^{P}$$

and distorted patches $$\{\psi_p\}_{p=1}^{P}$$

are obtained, where P is the total number of patches.

Figure 5C:
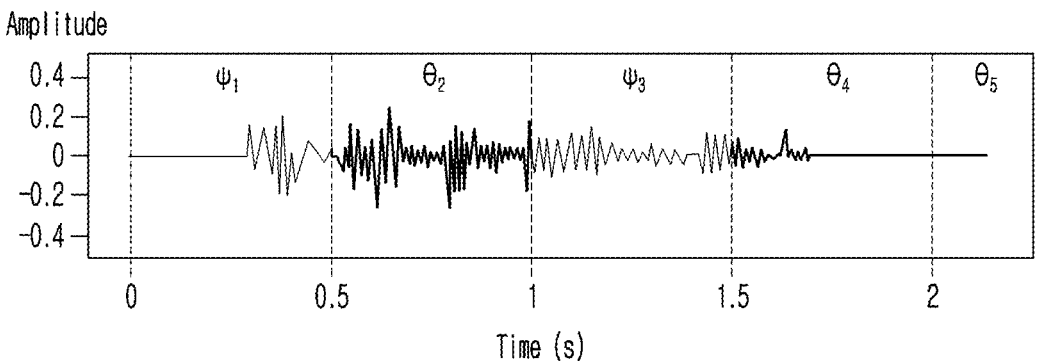
FIG. 5c illustrates an augmented signal z(n) comprises segments from the clean signal x(n) of FIG. 5a and the distorted signal y(n) of FIG. 5c, in which vertical dashed lines indicate the limits of each patch of size Lp=500 ms, ∀Vp=1, 2, . . . , 5, according to an embodiment of the present application.

Patch mixing step: The MAMP signal z(n) is obtained by first selecting each clean patch θp with a probability π or the distorted patch φp with the probability 1-π. Then, the selected patches are mixed by Φp(n)=πθp+(1-π)φp where Φp(n) is the pth patch of the signal z(n) shown in FIG. 5(c). The delay of the response function (e.g. RIR) is removed in order to align the x(n) and y(n) signals so that they can be mixed.

In the patch extraction step of the present embodiment (i.e. step 2 above), each of the first and second patches have the same length (Lp). However, in other embodiments each of the first and second patches could have a randomly determined length. For example, a random patch length may be implemented by randomly selecting a length L between a predefined minimum length Lmin and a predefined maximum length Lmax. In other embodiments however only a minimum length or a maximum length may be set, or no minimum or maximum length may be set when randomising the patch length. If random patch lengths are used, the first and second patches that correspond to the same part of the original signal (i.e. the 'clean' signal) should still have the same length, such that when the patches are mixed together the resulting signal still has the same overall length as the original signal.

In embodiments in which the first signal contains speech, a length of at least some of the first and second patches may be set according to a speech content of the respective first or second patch, such that each first or second patch contains at least one complete unit of speech. For example, the unit of speech may be a phoneme or sub-word, or may be any other unit of speech including but not limited to: a triphone (i.e. three phonemes); an utterance: a word: or a sentence.

In the patch mixing step of the present embodiment (i.e. step 3 above), patch mixing comprises randomly selecting respective ones of the first and second patches, and combining the randomly selected first and second patches to obtain the patched signal. In the present embodiment, the ones of the first and second patches are randomly selected according to at least one probability threshold, such that the at least one probability threshold defines a probability of one of the plurality of first patches being selected for a given part of the patched signal and a probability of one of the plurality of second patches being selected for the given part of the patched signal.

For example, the probability threshold(s) may take any value between a lower limit and an upper limit, for example from 0 to 1. A number may then be randomly generated between the lower and upper limits, and the corresponding first patch or second patch is selected according to whether the random number is above or below the respective threshold. If only one second signal is used, then a single probability threshold may be used, for example 0.5. In this example, if the random number is between 0 and 0.5 then the corresponding first patch is selected for the given part of the patched signal, and if the random number is between 0.5 and 0.1 then the corresponding second patch is selected for the given part of the patched signal. In this example, the probability ($\pi$) of a first patch being selected is 0.5, and the probability (1-$\pi$) of a second patch being selected is the same (i.e. since 1−0.5=0.5). It will be appreciated that if a different threshold is used, e.g. 0.25 or 0.75, the probability of a first patch vs a second patch being selected will increase or decrease accordingly.

Figure 9:
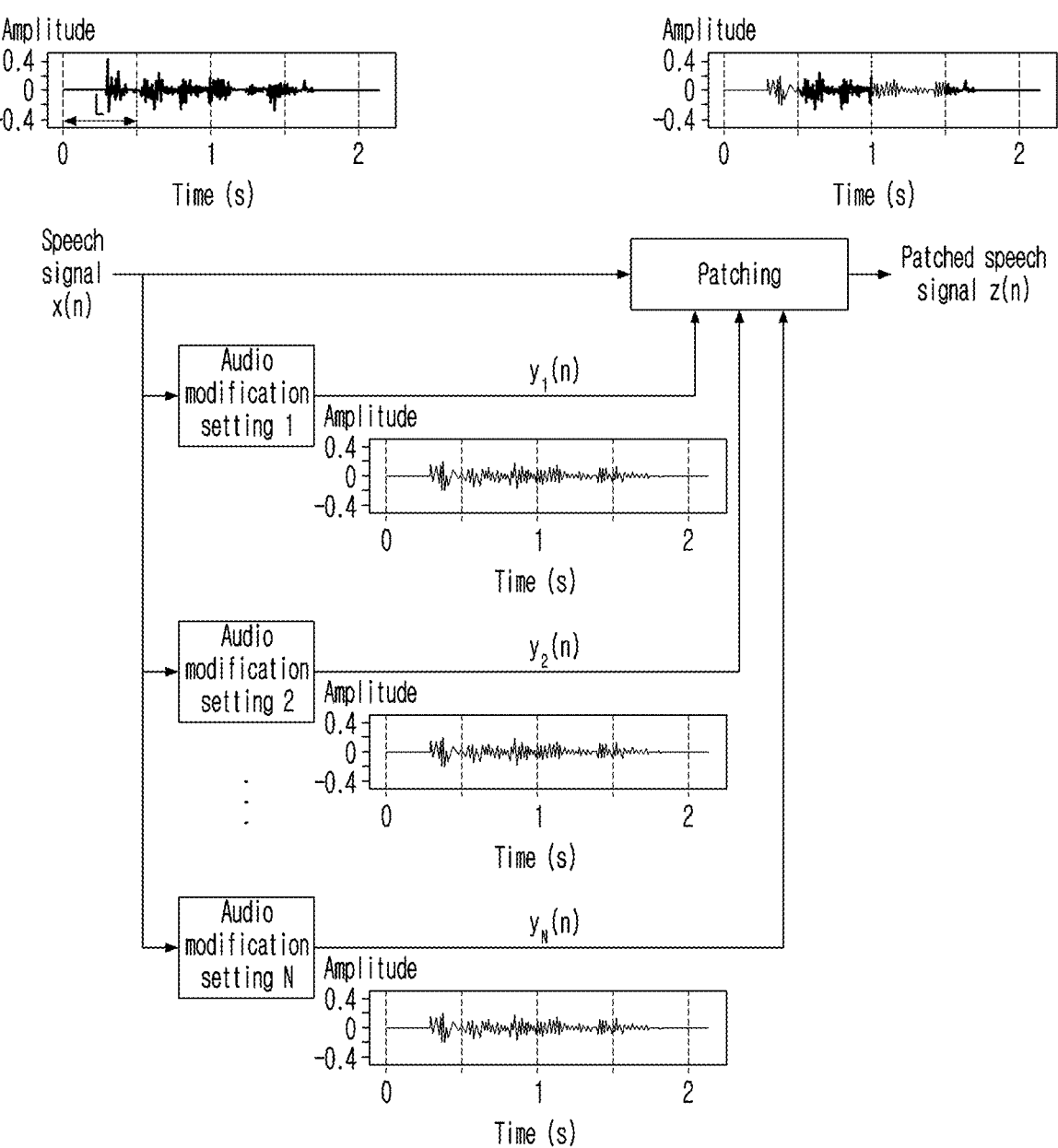
FIG. 9 is a flowchart illustrating a method of mixing and matching multiple audio modifications settings to the same audio signal during the patching stage of a pMCT pipeline, according to an embodiment of the present application.

In some embodiments more than one second signal may be obtained. For example, FIG. 9 illustrates an embodiment in which multiple different audio modifications settings (i.e. different distortions) are applied to the same audio signal during the patching stage of a pMCT pipeline.

If more than one second signal is used, for example three second signals, a different probability threshold may be set for each second signal. In other words, a plurality of probability thresholds may be used. For example, in the case of three second signals being generated (e.g. by applying three different distortions to the first signal), respective thresholds may be set at 0.25, 0.5 and 0.75. For example: if the randomly-generated number lies between 0 and 0.25 then the corresponding first patch may be chosen: if the randomly-generated number lies between 0.25 and 0.5 then the corresponding patch from a first one of the second signals may be chosen; if the randomly-generated number lies between 0.5 and 0.75 then the corresponding patch from a second one of the second signals may be chosen; and if the randomly-generated number lies between 0.75 and 1 then the corresponding patch from a third one of the second signals may be chosen. In this example the probability of any given patch being selected from the first signal or one of the second signals is the same, but it will be appreciated that the probability of a patch being selected from any given one of the first or second signals may be increased or decreased by setting different thresholds.

In some embodiments, the at least one probability threshold may be set in dependence on an identity of the current user, such that different values of the at least one probability threshold may be set for different users. For example, the at least one probability threshold may be set in dependence on historical data associated with the identity of the current user. In this way, optimised thresholds may be set for the current user, increasing the accuracy of the audio recognition method (e.g. speech recognition in the case of an ASR model).

As an example, the historical data associated with a user may be indicative of a likelihood that any given recording of that user's speech is a clean signal (i.e. relatively free from distortions such as reverberation, noise etc.). This approach can take into account the different ways in which users may use their devices. For example, in embodiments in which a speech signal is captured from a user's mobile phone, one user may frequently use their phone in noisy environments whereas another user may tend to use their phone more often in quieter environments. As such, speech signals of different users may have a different likelihood of being a noisy signal vs a clean signal. When the historical data indicates that the current user's speech signal has a relatively high likelihood of being a clean signal, the probability threshold may be set such that for any given portion of the patched signal there is a higher probability that a first patch is selected as opposed to a second patch.

Another example of historical data that may be used to set the probability threshold can be historical data indicative of the accuracy of different models when applied to speech signals for the current user, where the different models comprise models that have been trained on patched signals obtained using different respective probability thresholds. In this example, an independent measure of the accuracy (e.g. WER) may be used to assess the accuracy of each model, for example by displaying or otherwise outputting the most likely sequence of words that is obtained by each model to the user and asking them to confirm whether or not the sequence of words is correct. In this example, the historical data may be used to identify which one of the different models produced the most accurate results for the current user, and the probability threshold that was used to generate the patched signals for training that model can be used as the probability threshold when generating new patched signals to be used when updating the model.

In other embodiments, instead of randomly selecting first and second patches as described above, the first and second patches could be selected in a non-random manner. For example, the first and second patches could be selected according to a predefined sequence, such as a pseudo-random sequence generated according to a predefined algorithm as opposed to being a truly random selection.

3.3.2. MAMP on Audio Feature Space

Figure 6:
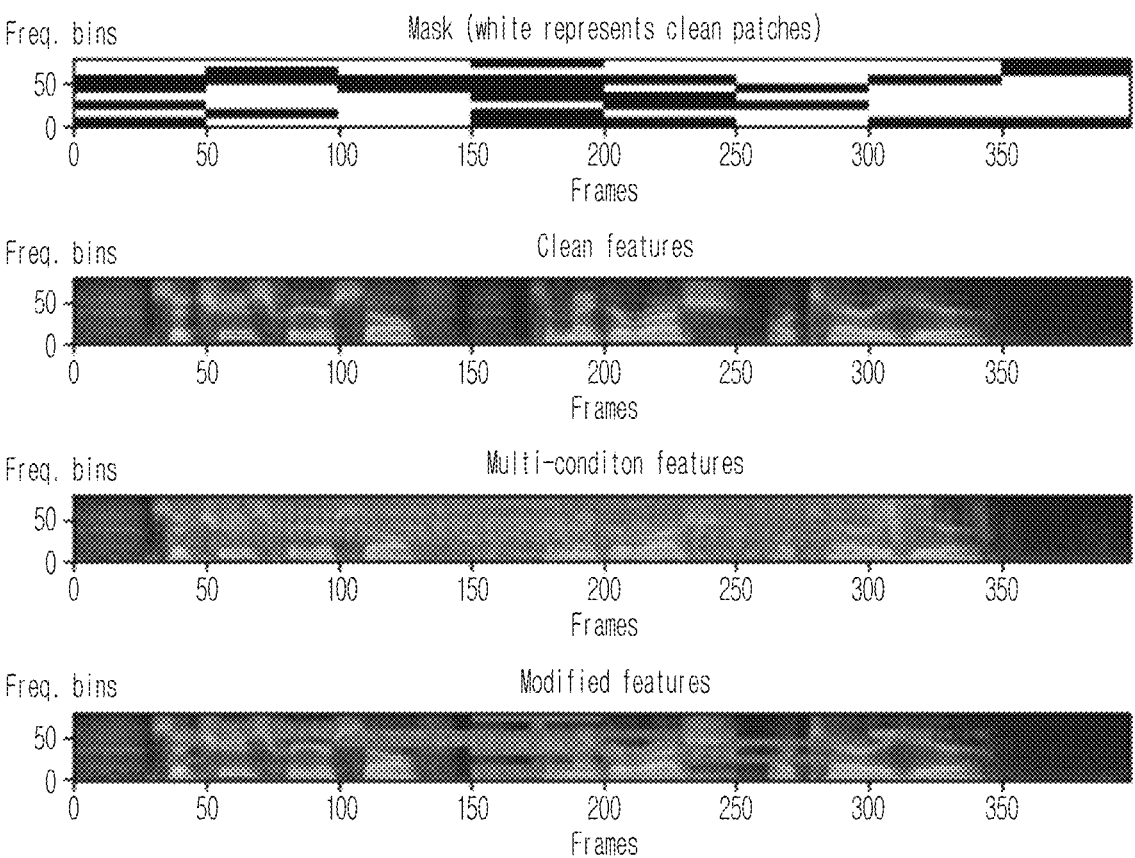
FIG. 6 illustrates four plots, as follows: the top plot shows an example of a mask H∈{0, 1}M×F used to create the MAMP mel-spectrogram (MAMP-M) signal z(n); the second plot shows the mel-spectrogram ψ(m, f), ∀m∈[M], f∈[F] of the clean signal x(n); the third plot shows the mel-spectrogram γ(m, f), ∀m∈[M], f∈[F] of the distorted signal y(n); the bottom plot displays the mel-spectrogram β(m, f), ∀m∈[M], f∈[F] of MAMP-M signal z(n), according to an embodiment of the present application.

The proposed MAMP can be employed on a space of mel-spectrogram features extracted from audio signals as shown in FIG. 6 and described as follows.

Computing features: Mel-spectrograms for the m-th frame and f-th frequency bin $\psi$m, f) and $\gamma$(m, f) of x(n) and y(n) are computed, respectively, $\forall$m$\in$[M]1, f $\in$[F].

Generating masks: A mask H$\in$ {0, 1}M$\times$F is generated by randomly drawing its elements from a distribution such as the uniform distribution. Each submatrix Hp $\in$ 1Mp$\times$Fp and Hp$\in$0Mp$\times$Fp of H is shown by a white and black block at the top of FIG. 6, respectively.

Patch extraction and mixing: The patches are extracted and mixed to compute the MAMP mel-spectrogram (MAMP-M) $\beta$(m, f) by $$\beta(m, f) = \pi H(m, f) \odot \psi(m, f) + (1 - \pi)H(m, f) \odot \gamma(m, f), \qquad (2)$$

where $\odot$ denotes the Hadamard (element-wise) product.

In the present embodiment, a time-to-frequency domain transformation is used to obtain a Mel-spectrogram. However, other types of domain transformation can be applied to create the feature representation, such as a wavelet transformation or neural network based transformation. In general, a neural network based transformation is based on using a latent space of the ASR model. Here, the term 'latent space' refers to the output of a given layer in the neural network. For example, ASR models can have a few CNN layers at the beginning to process the audio, followed by some Transformer blocks to extract linguistic features to get the estimated transcriptions. In this example, the output of the CNN layers could be taken as the wavelet-transformed signal, and these signals (i.e. the output of the CNN layers) can be divided to obtain the first and second patches for generating the patched signal.

When a domain transformation is applied prior to dividing the first and second signals, whether a time-to-frequency domain transformation or otherwise, dividing the first and second signals comprises dividing the respective first and second spectrograms obtained via the transformation so as to obtain the plurality of first and second patches. In other words, each patch comprises a part of the first or second spectrogram obtained by applying the domain transformation to the respective first or second signal.

In the case of the Mel-spectrogram, which comprises a plurality of frequency bins associated with each one of a plurality of frames, each frame corresponding to a different time-domain portion of the respective first or second signal, each of the first and second patches may correspond to at least one frequency bin and at least one frame (i.e. as shown in the top of FIG. 4).

Figure 10:
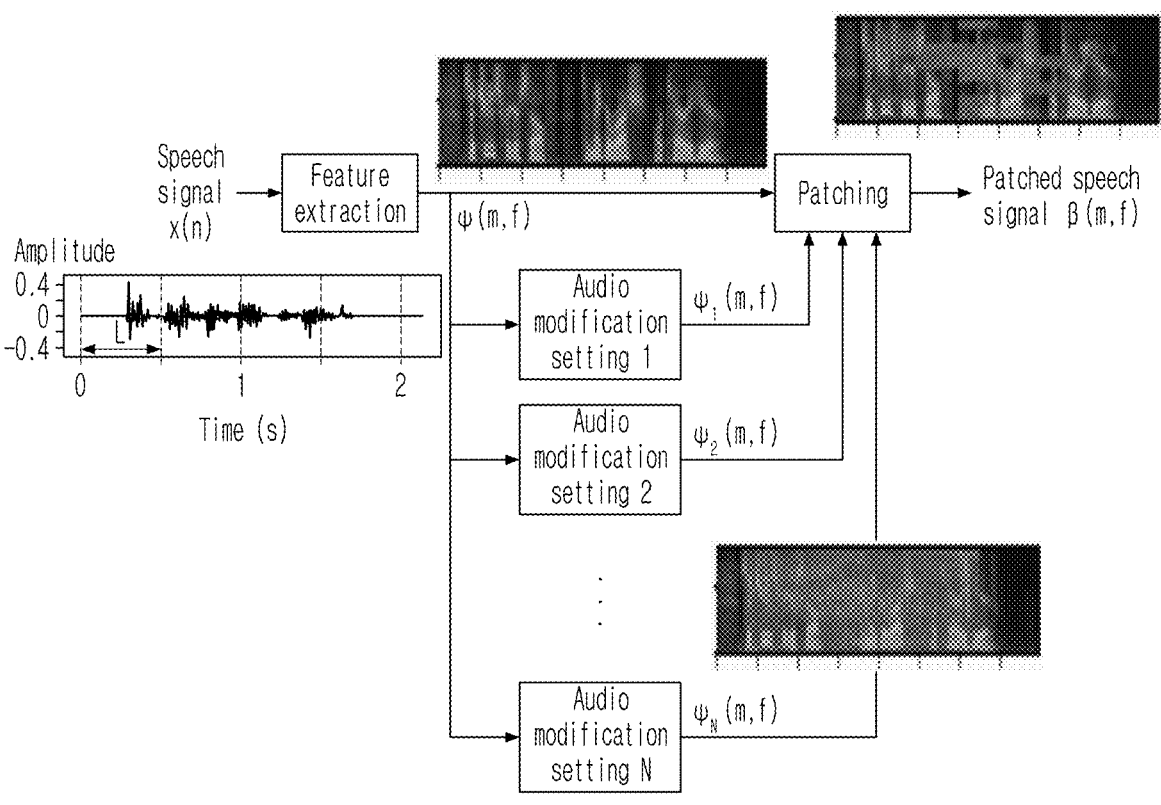
FIG. 10 illustrates a MAMP method with multiple audio modification settings in audio feature space, according to an embodiment of the present application.

In general terms, if the domain transformation produces a spectrogram comprising a vector with components, then A components can be selected from either the function of the first signal or from the function of the second signal to obtain the patched signal. Also, the principles discussed above in relation to embodiments in which a domain transformation is applied before dividing the first and second signals into patches may equally be applied to embodiments in which multiple different audio modification settings are applied in audio feature space (i.e. a domain-transformed signal). For example, FIG. 10 illustrates a MAMP method with multiple audio modification settings in audio feature space, according to an embodiment of the present application.

3.4. Patched Multi-Condition Training

The block diagram presented in FIG. 3 shows an embodiment of the pMCT pipeline, comprising a database 301, pre-processing block 302, feature extraction block 303 and ASR model 304. Firstly the data is retrieved from a database 301 to be pre-processed. The pre-processing block 302, which may also be referred to as a 'pre-processing module' or 'pre-processing unit', applies the MAMP transformation 305 described in Section 3.3.1 followed by data augmentation techniques 306 such as SpecAugment. The feature extraction block 303, which may also be referred to as a 'feature extraction module' or 'feature extraction unit', uses the pre-processed data and computes some features used by the ASR model 304. Typically, this feature extraction is carried out to reduce the dimensionality of the input data whilst preserving the relevant information for speech recognition. The ASR model maps these features into a sequence of most likely letters which is used to compute the loss against labelled data and perform back-propagation to update the model.

Figure 7:
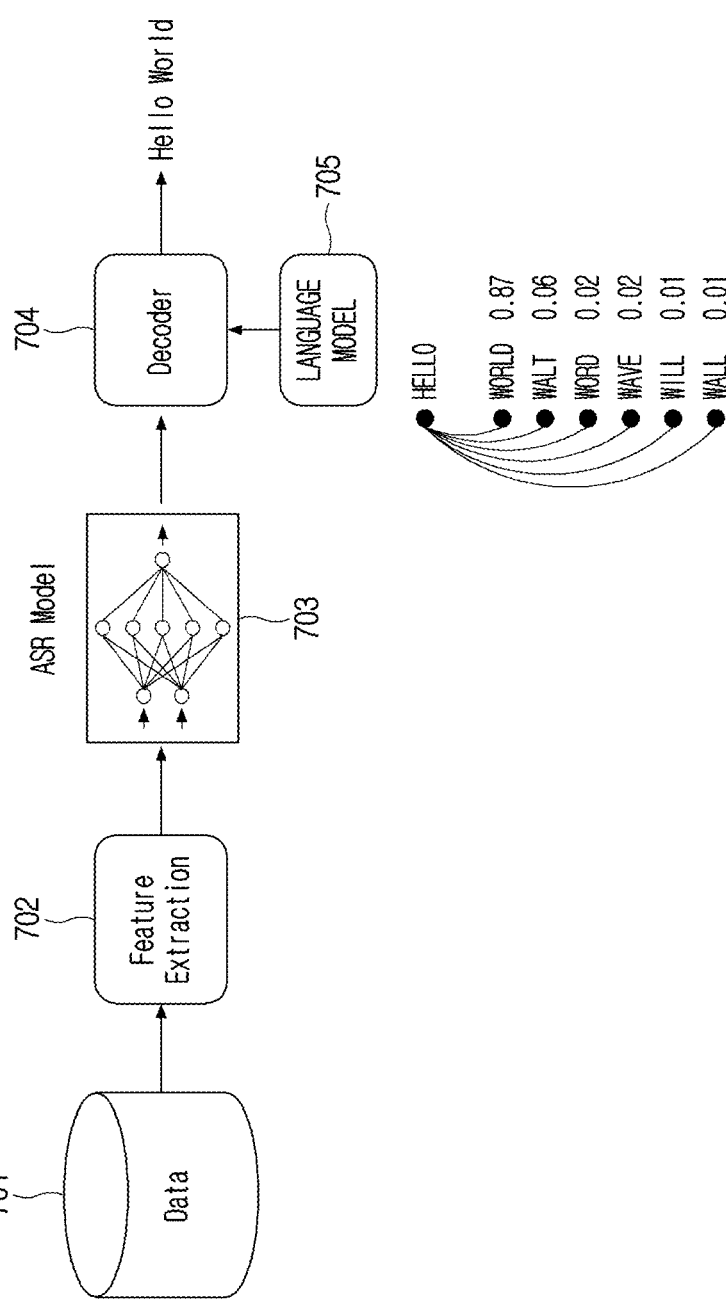
FIG. 7 is a flowchart illustrating a pMCT pipeline for inference, according to an embodiment of the present application.

During inference, as shown in FIG. 7, the feature extraction 702 is directly applied to the data from the database 701 which is then passed through the ASR model 703 to get the likelihood of multiple sequences of letters. The decoder 704 concatenates these sequences of letters to create words and uses a language model 705 to apply language probability on each of them depending on the previously decoded words. Finally, the decoder returns the most likely sequence of words.

Although FIG. 7 illustrates an embodiment configured for ASR, it will be appreciated that similar principles may be applied to recognise other types of audio. Hence, in general terms embodiments of the present application may be applied to any automatic audio and/or speech recognition method and apparatus. In the inference stage, the automatic audio and/or speech recognition is performed using a model trained on a dataset comprising a plurality of patched signals obtained using any of the methods disclosed herein.

Figure 8:
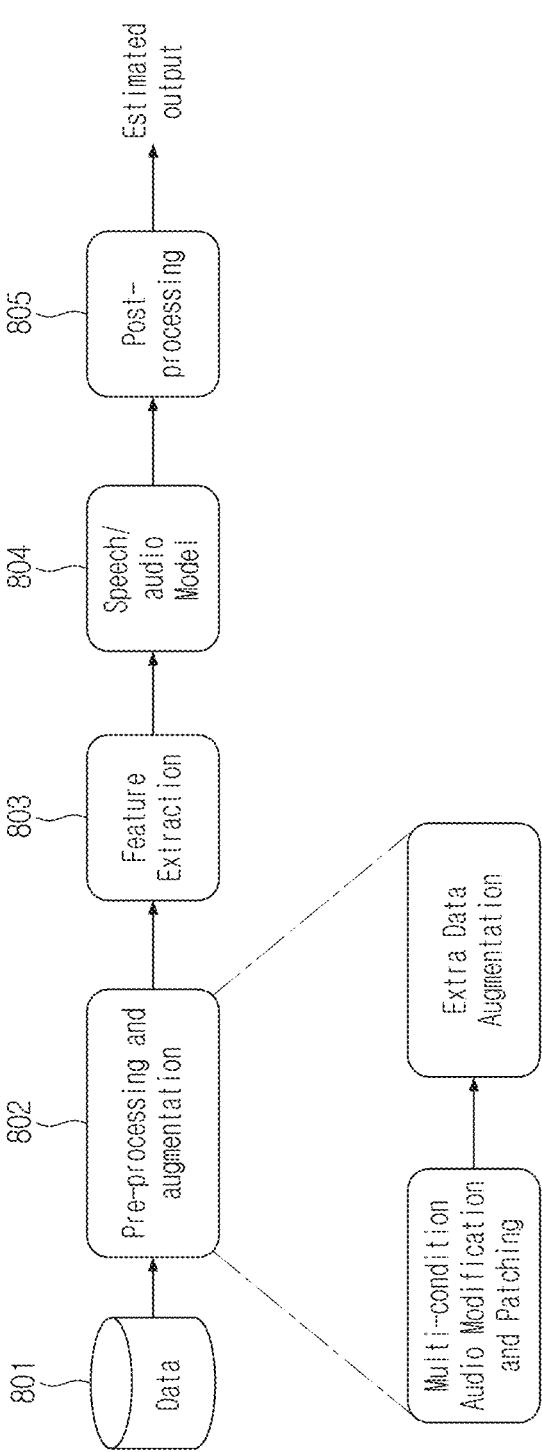
FIG. 8 is a flowchart illustrating a pMCT pipeline containing data pre-processing & augmentation, feature extraction and speech/audio model and post-processing, according to an embodiment of the present application.
Figure 12:
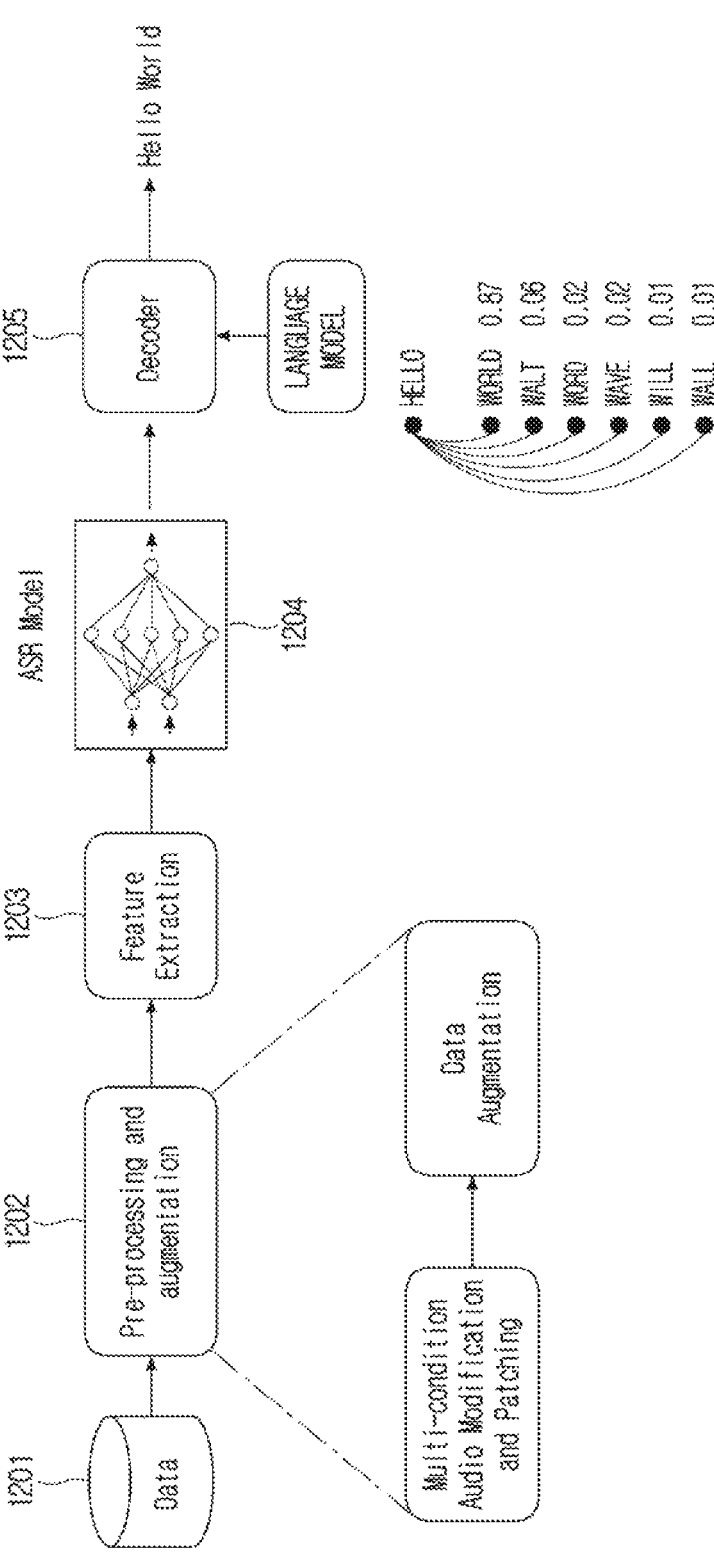
FIG. 12 is a flowchart illustrating an ASR training pipeline using pMCT, according to an embodiment of the present application.

In some embodiments features of the pipelines illustrated in the above-described embodiments may be combined. For example, FIG. 8 illustrates an embodiment of a pMCT pipeline comprising a database 801, a pre-processing and augmentation block 802 similar to that of the embodiment in FIG. 3, a feature extraction block 803, speech/audio model 804, and a post processing block 805 (e.g. a decoder similar to that of the embodiment in FIG. 7). Similarly, FIG. 12 illustrates an ASR training pipeline using pMCT comprising a database 1201, a pre-processing and augmentation block 1202 similar to that of the embodiment in FIG. 3, a feature extraction block 1203, ASR model 1204, and a decoder 1205 similar to that of the embodiment in FIG. 7, according to an embodiment of the present application.

4. EVALUATION OF PMCT IN ASR TASKS

4.1. Experimental Setup

In the experiments, ASR models are implemented using the transformer recipe of SpeechBrain for LibriSpeech2. The recipe implements an end-to-end transformer ASR architecture with a Conformer encoder. The Conformer configuration follows the Conformer (S) and we used a transformer language model. The loss is computed using a weighted average of the CTC loss and KL-divergence with label smoothing. The label smoothing parameter is 0.15.

All the experiments implemented using the 100h dataset are reported using beam search size of 1 to speed up the analyses, while final results on the 960h dataset are obtained using a beam search of 10.

4.2. Datasets

4.2.1. LibriSpeech Corpus

LibriSpeech comprises a 960h dataset of English utterances obtained from audiobooks, sampled at 16 kHz. Illustrative embodiments of the application discussed herein make use of either train-clean-100-a 100h subset, or the entire 960h dataset for training. The dev-clean, test-clean and test-other are employed for evaluation purposes. Model performance is reported in terms of Word Error Rate (WER).

4.2.2. VOICES

VOICES is a dataset created by recording LibriSpeech utterances played in acoustically challenging conditions. Using this dataset for evaluation set allows assessing accuracy of the proposed methods in noisy reverberant environments. The evaluation set for ASR comprises of 20h of data originating from 98 different speakers.

4.2.3. Datasets used for Data Augmentation

In the experimental analyses, reverberation is considered as a form of deformation. Therefore, a set of RIRs gathered from three datasets is used, giving rise to 325 different RIRs. The level of reverberation ranges from −2 dB to 40 dB in terms of C50.

A set of 843 noise samples obtained from the Freesound portion of the MUSAN corpus is used in the present disclosure. The signal-to-noise (SNR) is randomly sampled from a uniform distribution between 0 dB to 30 dB.

5. EXPERIMENTAL ANALYSES

5.1. Ablation Studies

In this section, ablation studies are provided to analyze the effect of using different patch selection probability $\pi$, patch length L and spectral augmentation policies on the accuracy of models. Librispeech 100h dataset was used to find the best hyper-parameters of MCT, pMCT and pMCT-M.

5.1.1. Analyses of the Effect of $\pi$

Firstly, it is investigated how model accuracy varies as a function of probability of having a clean patch $\pi$ for pMCT in Table 1. In the table, rand indicates that the utterance is selected with a different probability value drawn from a uniform distribution. As shown in Table 1, in this particular embodiment it is found that best WER is achieved using $\pi=0.5$. However, it is to be expected that the optimum value of $\pi$ may differ in other embodiments.

TABLE 1

| Comparison of WER of models on the dev-clean set for different values of $\pi$. | |
| --- | --- |
| $\pi$ | WER (%) |
| 0 | 10.53 |
| 0.25 | 10.04 |
| 0.5 | 9.76 |
| 0.75 | 9.84 |
| 1 | 10.91 |
| rand | 9.98 |

5.1.2. Analyses of the Effect of L

Next, it is investigated how varying the patch size, L, affects training. Different sizes are tested as indicated in Table 2, which suggests that in this particular embodiment the best patch size is between 1 and 1.5 seconds. Again, it is to be expected that the optimum patch size may differ in other embodiments. For example, different patch lengths may be used when dealing with different languages.

TABLE 2

| Comparison of WER of models on the dev-clean set for different of patch size L. | |
| --- | --- |
| L(s) | WER (%) |
| 0.5 | 9.79 |
| 0.75 | 9.78 |
| 1 | 9.76 |
| 1.5 | 9.76 |
| 2 | 9.98 |

5.1.3. Analyses of the Effect of Spectral Augmentation Policies

It is important to investigate whether the strength of SpecAugment should be modified when used in conjunction with pMCT. To check this, the inventors have experimented with modifying the masking strength of Adaptive SpecAugment, as shown in Table 3. High policy corresponds to the LibriFullAdapt policy, whereas the mid and low policies are obtained by dividing masking parameters, such as number masks and mask length, by 2 and by 4, respectively. The inventors have found that when used in conjunction with pMCT, aggressiveness of pMCT can be lowered to achieve best accuracy. Hence, throughout the results discussed below, the mid policy is employed when using SpecAugment alongside pMCT, unless stated otherwise.

TABLE 3

| Comparison of WER of the dev-clean set for different SpecAugment settings applied on top of pMCT. | |
| --- | --- |
| Setting | WER (%) |
| High | 11.79 |
| Mid | 9.3 |
| Low | 9.96 |

5.1.4. Ablation for the pMCT-M

Previous analyses indicate that one of the best settings for pMCT is $\pi=0.5$ and L=1 which is the configuration used in the remaining experiments with pMCT. In the case of pMCT-M, there are three parameters that can be adjusted: the probability of clean patch selection $\pi$, the patch size along the time axis M and the patch size along the Mel-scale filters axis F. Similar to the analyses carried out for pMCT, different settings were analysed but excluded from the present analysis due to space limitation. In this particular embodiment, the best settings found for pMCT-M are $\pi=0.5$, M=1 and F=40 where F is limited by F≤80 due to the number of elements in filter bank applied to the input short-time Fourier transform in Mel scale. This setting achieved a WER on dev-clean of 9.62%. Also, different specAugment settings were applied achieving the best WER on dev-clean of 9.52%. Again, it is to be expected that the optimum values for $\pi$, M, and F may differ in other embodiments.

5.1.5. Ablation for the MCT

One of the baselines to compare pMCT is MCT. Three settings are explored for the MCT implementation: probability of adding reverberation to the input signal pr, probability of adding noise to the signal pn and specAugment setting. In order to reduce the amount of combination we set pn=pr. Table 4 shows that in this particular embodiment the lowest WER is achieved with pn=0.5 and pr=0.5, and this is the setting used for MCT in the remaining of this disclosure. Again, it is to be expected that the optimum values for pn and pr may differ in other embodiments.

Results obtained by employing specAugment on MCT are shown in Table 5, indicating that in the present embodiment the best results are obtained for mid setting.

TABLE 4

| WER of models on the dev-clean of MCT with different probabilities applied to noise pn and reverberation pr. | | |
| --- | --- | --- |
| $p_n$ | $p_r$ | WER (%) |
| 0 | 0 | 10.91 |
| 0.25 | 0.25 | 10.05 |
| 0.5 | 0.5 | 10.00 |
| 0.75 | 0.75 | 10.01 |
| 1 | 1 | 10.56 |

TABLE 5

| Comparison of WER of models on the dev-clean set for different specAugment settings applied on top of MCT. | |
| --- | --- |
| Policy | WER (%) |
| High | 10.16 |
| Mid | 9.25 |
| Low | 9.59 |

5.1.6. Comparative Evaluation on the Test Datasets

Table 6 summarizes all the results and extends the evaluation of the methods for other three datasets: test-clean, test-other and VOICES. The baseline in this case corresponds to training models with LibriFullAdapt policy for specAugment, but without using MCT or pMCT. The results show that pMCT with specAugment provides the best results for the majority of the datasets, especially remarkable on VOICES.

TABLE 6

Summary of WER (%) of models trained on
the 100 h dataset using a beam size of 1.

| Method | dev-clean | test-clean | test-other | VOiCES |
|---|---|---|---|---|
| Baseline | 9.52 | 9.56 | 24.51 | 75.07 |
| MCT w/o specAug | 10.00 | 9.23 | 24.74 | 36.79 |
| pMCT w/o spec Aug | 9.76 | 9.39 | 25.09 | 31.58 |
| pMCT-M w/o specAug | 9.62 | 9.13 | 25.03 | 32.58 |
| MCT w/specAug | 9.25 | 9.50 | 24.29 | 36.19 |
| pMCT w/specAug | 9.3 | 9.15 | 23.21 | 27.97 |
| pMCT-M w/specAug | 9.52 | 9.61 | 23.92 | 32.40 |

5.2. Analyses for Training Models on Larger-Scale Datasets

In this section, the different methods tested in Table 6 are trained with the full training set of LibriSpeech. Table 7 shows that pMCT shows the best WER in the majority of the sets being quite noticeable for the noisy reverberant dataset VOICES. As in the case for Table 6, the baseline in Table 7 refers to training models with LibriFullAdapt policy for specAugment but without using MCT or pMCT.

In addition, Table 7 also shows the importance of adding multi-condition samples in the training set since this provided more than a 50% relative WER reduction on VOICES database in the worst case (i.e. MCT w/o specAug).

The specAugment augmentation scheme can provide additional improvement when applied after MCT, pMCT or pMCTM as shown in Table 7. In most of the test cases, lower WER is achieved using specAugment.

TABLE 7

Summary of WER (%) of models trained
on the 960 h dataset. Beam size 10.

| Method | dev-clean | test-clean | test-other | VOiCES |
|---|---|---|---|---|
| Baseline | 2.59 | 2.74 | 6.51 | 33.30 |
| MCT w/o specAug | 2.43 | 2.72 | 7.07 | 14.85 |
| pMCT w/o specAug | 2.44 | 2.67 | 6.90 | 12.83 |
| pMCT-M w/o specAug | 2.37 | 2.59 | 6.98 | 13.88 |
| MCT w/specAug | 2.42 | 2.65 | 6.59 | 12.86 |
| pMCT w/specAug | 2.42 | 2.41 | 6.36 | 9.89 |
| pMCT-M w/specAug | 2.43 | 2.57 | 6.53 | 12.83 |

Figure 11:
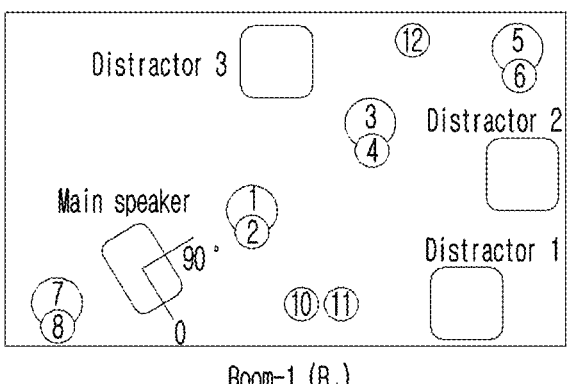
FIG. 11 illustrates models for four different rooms, R1 to R4, included in an evaluation dataset of VOICES, according to an embodiment of the present invention.
Figure 11:
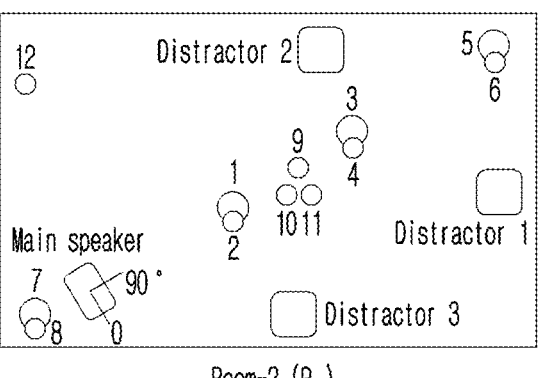
Figure 11:
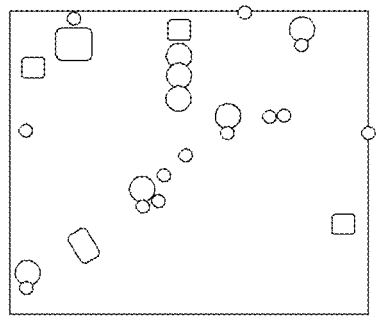
Figure 11:
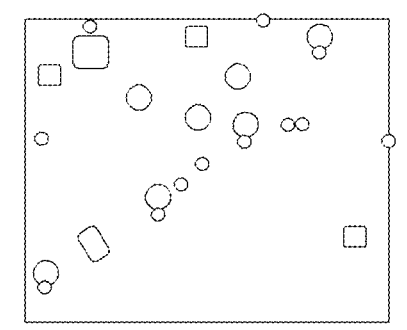
Figure 11:
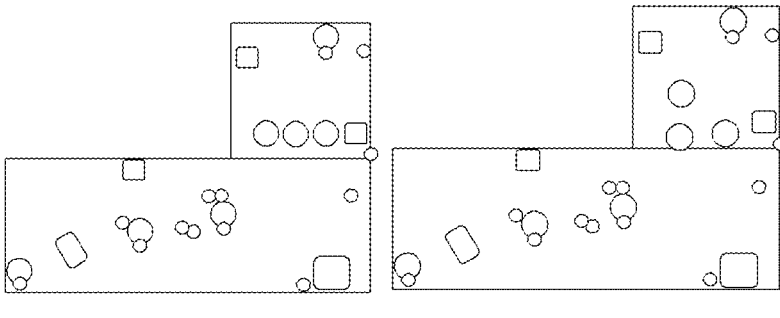

The audio samples of the VOICES dataset were recorded in four rooms {Ri}4i=1, comprising models R1 to R4 with layouts as illustrated in FIG. 11.

The test WER of the models with the best WER were examined on the dev-clean dataset using samples collected in each room in Table 8. The results show that pMCT outperforms MCT in all rooms. It is also clear that the models perform better on smaller rooms (R1 and R2) due to the decrease of reverberation in these setups.

TABLE 8

Analyses of the models for the four different
rooms included in evaluation dataset of VOiCES.

| Method | R1 | R2 | R3 | R4 |
|---|---|---|---|---|
| MCT w/specAug | 5.70 | 5.68 | 24.13 | 15.19 |
| pMCT w/specAug | 4.74 | 5.18 | 15.34 | 13.78 |

Table 9 shows the WER provided by these best MCT and pMCT models for different noise types considered in the evaluation dataset of the VOICES. In general, pMCT outperforms MCT for all types of noises. Moreover, babble noise tends to be the most challenging noise mainly due to the similarity with the target speech.

TABLE 9

Analyses of the models for the four noise types;
no noise included (none), music (music), television
sound (tele) and babble noise (babb).

| Method | none | music | tele | babb |
|---|---|---|---|---|
| MCT w/specAug | 15.33 | 7.94 | 7.93 | 15.84 |
| pMCT w/specAug | 10.02 | 6.67 | 7.17 | 14.81 |

5.3. Comparison of MCT and pMCT Employed on State-of-the-Art Robust ASR Models In order to examine the benefits of using pMCT compared to MCT in other methods proposed for robust ASR, pMCT was employed to train these models and compared the results with the MCT counterpart. Table 10 shows the WER achieved by using pMCT instead of using MCT. The results indicate that using pMCT improves the WER over the MCT variant of the method.

One of the reasons of observing the difference between the WER of pMCT and MCT is that the multi-condition augmentation is only applied to 20% of the training data leaving the remaining 80% of the data clean. Thus, the difference in the final training data is reduced compared to applying multi-condition augmentation to the entire training set.

TABLE 10

Comparison of WER (%) of models trained on 960 h using the
method with and without employing pMCT. Beam size is 10.

| Method | dev-clean | test-clean | test-other | VOiCES |
|---|---|---|---|---|
| w/0 pMCT | 2.55 | 2.73 | 6.35 | 13.15 |
| w/pMCT | 2.32 | 2.5 | 6.3 | 13.09 |

6. CONCLUSIONS

The present disclosure presents pMCT, a data augmentation approach to improve the ASR performance especially in noisy reverberant conditions where a relative WER reduction of 22.71% compared to MCT was achieved. This solution is simple and requires negligible additional computation cost or no extra data compared to MCT. Experimental results show that it improves in clean conditions and noisy reverberant compared to the MCT baseline. Moreover, specAugment augmentation scheme was applied on top of pMCT achieving further improvements. The pMCT approach was also included in pipeline of other techniques that employ MCT showing improvements of using pMCT over MCT.

The contributions made by embodiments of the present application can be summarized as follows:

A simple yet effective multi-condition method called patched multi-condition training (pMCT) is disclosed, as depicted in FIG. 3, which improves ASR accuracy, especially for noisy reverberant conditions. pMCT employs a novel method, called multi-condition audio modification and patching (MAMP), which mixes the same utterance patches extracted from clean and distorted speech (FIG. 3).

Experimentally, pMCT achieves 22.71% relative WER reduction compared to the MCT on VOICES-a dataset of samples collected in noisy, reverberant conditions. The method delivers particularly large improvements in terms of WER on speech recorded in large rooms.

The disclosed MAMP method can be combined with any data augmentation method such as SpecAugment to improve accuracy of pMCT. It has been found that employing pMCT with SpecAugment further improves WER on both clean (up to 3.5% WER) and noisy (up to 0.54% WER) datasets.

Whilst certain embodiments of the application have been described herein with reference to the drawings, it will be understood that many variations and modifications will be possible without departing from the scope of the application as defined in the accompanying claims.

What is claimed is:

1. A method implemented by a processor of obtaining a patched signal for training a model for use in at least one of a speech and an audio recognition, the method comprising:

obtaining a first signal, wherein the first signal is at least one of a speech and an audio signal;

modifying the first signal to obtain at least one second signal;

dividing the first signal and the at least one second signal respectively into a plurality of first patches and a plurality of second patches, wherein each one of the plurality of first patches comprises a respective part of the first signal and each one of the plurality of second patches comprises a respective part of the at least one second signal;

mixing selected ones of the plurality of first patches and the plurality of second patches to obtain a patched signal; and training the model for use in at least one of the speech and the audio recognition using the patched signal, wherein mixing the selected ones of the plurality of first patches and the plurality of second patches comprises randomly selecting respective ones of the first and second patches, and combining the randomly selected first and second patches to obtain the patched signal, wherein the ones of the first and second patches are randomly selected based on at least one probability threshold corresponding to an identity of the current user.

2. The method of claim 1, wherein the ones of the first and second patches are randomly selected according to the at least one probability threshold, such that the at least one probability threshold defines a probability of one of the plurality of first patches being selected for a given part of the patched signal and a probability of one of the plurality of second patches being selected for the given part of the patched signal.

3. The method of claim 2, wherein the at least one probability threshold is set in dependence on the identity of the current user, such that different values of the at least one probability threshold may be set for different users.

4. The method of claim 3, wherein the at least one probability threshold is set in dependence on historical data associated with the identity of the current user.

5. The method of claim 1, wherein modifying the first signal comprises convolving the first signal with a distortion function.

6. The method of claim 5, wherein the distortion function is a room impulse response, RIR, function.

7. The method of claim 6, wherein the RIR function introduces a delay in the at least one second signal relative to the first signal, the method further comprising:

removing the delay from the at least one second signal prior to obtaining the patched signal.

8. The method of claim 1, wherein modifying the first signal comprises adding noise into the first signal.

9. The method of claim 8, wherein the noise comprises random noise.

10. The method of claim 8, wherein the noise comprises one or more recordings of background noise samples.

11. The method of claim 8, wherein the noise comprises one or more synthesized noise samples.

12. The method of claim 1, wherein the at least one second signal comprises a plurality of second signals, and modifying the first signal to obtain the plurality of second signals comprises applying different modifications to the first signal to obtain respective ones of the plurality of second signals.

13. The method of claim 1, wherein each of the first and second patches have the same length.

14. The method of claim 1, wherein each of the first and second patches has a randomly determined length.

* * * * *